June 7, 1927.
R. T. HOSKING
LOCK WASHER
Filed Feb. 14, 1925
1,631,415
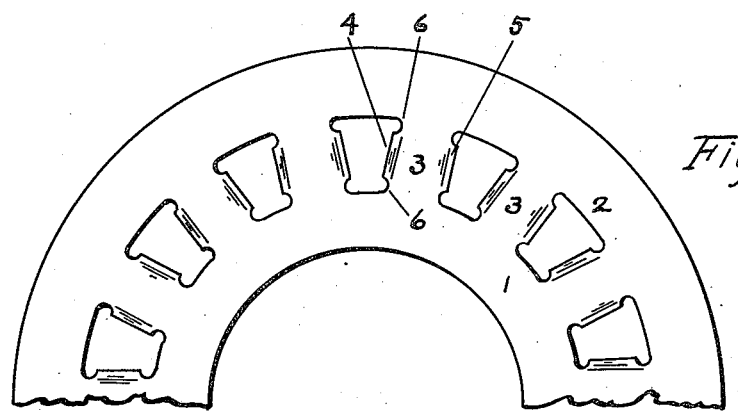
Fig. 1.
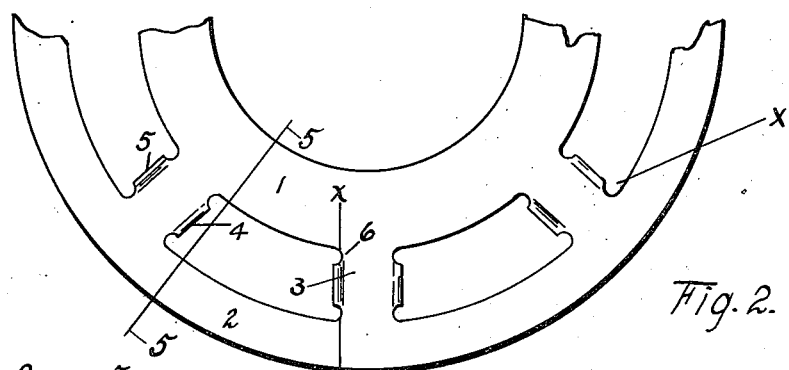
Fig. 2.
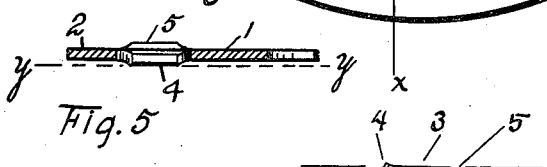
Fig. 5.
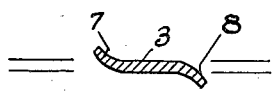
Fig. 3.
Fig. 4.
INVENTOR
Richard T. Hosking
BY
George B. Willcox
ATTORNEY Patented June 7, 1927.

1,631,415

UNITED STATES PATENT OFFICE.

RICHARD T. HOSKING, OF WILMETTE, ILLINOIS, ASSIGNOR, BY MESNE ASSIGNMENTS, TO SHAKEPROOF LOCK WASHER COMPANY, INCORPORATED, OF CHICAGO, ILLINOIS, A CORPORATION OF DELAWARE.

LOCK WASHER.

Application filed February 14, 1925. Serial No. 9,147.

This invention relates to lock washers of the biting tooth type, and particularly washers in which the body consists of an outer and an inner annular ring connected by bars or teeth of spring material, the lateral edges of the bars comprising planes or bits that bite into the nut or the substructure when the nut tends to unscrew.

The shape and construction of the bar or tooth is the specific subject of this improvement, the purpose being to provide the bar with a biting edge, the whole length of which is equally offset from the plane of the washer so as to give uniform and powerful biting effect throughout the length of the edge. The body of this bar or tooth is flat, instead of being warped or twisted as in spring lock washers of the prior art.

In Patent No. 1,486,347, issued March 11, 1924, I have described and claimed a washer comprising annular inner and outer body portions connected by substantially radially disposed bars or strips spaced apart circumferentially. Each strip is twisted at its middle, to cause the middle parts of its diagonally opposite edges to be offset with respect to the plane of the washer. The greatest effectiveness of such a twisted bar is attained when the bar, as is described in the patent referred to, has the proper cross-sectional shape and proportions to make it tend to roll and thereby lock by strut-like action between the nut or head and the substructure.

Such twisted strut-action bars give ample gripping or locking effect to a washer. In fact, it has been found advisable in some installations to decrease the number of bars on a washer because the locking effect was so great as to make it difficult to loosen the nut or bolt even by means of a powerful wrench.

It is advisable in some instances, however, to employ teeth or bars of greater width and of such flat shape that the strut-like or rolling function is not present, in which case the desired gripping action is attained wholly by the planing or scraping function of the working edges of the individual bars. Such planing action by the edge of a wide tooth has heretofore been rather ineffectively secured by warping or twisting the tooth to form a biting edge. Twisting a wide tooth, however, so warps the edge that it is unequally offset and consequently only a small part of its length, i. e., the tip of the working edge, is available for biting effect. It has become desirable to improve this scraping-action type of washer by devising means whereby the entire length of the working edge of a wide tooth or bar can be utilized for biting, and to accomplish that result without setting up undue tearing strains in the metal. I have, therefore, produced a spring bar of any desired width as distinguished from the narrow rolling-type tooth of my patent referred to, yet capable of exerting a grip which, although not so positive as that of a narrow bar having the rolling or strut characteristic above described, is, I believe, much greater than the grip exerted by any scraping-function device that has heretofore been produced because, as previously stated, warping the bar secures only a short biting edge.

With the foregoing and certain other objects in view which will appear later in the specifications, my invention comprises the devices described and claimed and the equivalents thereof.

In the drawings Fig. 1 is a plan view of a washer with radially disposed biting edges embodying my improvement.

Fig. 2 is a slightly modified form, with parallel biting edges.

Fig. 3 is a part sectional fragmentary view on the line 3—3 of Fig. 2.

Fig. 4 is a view similar to Fig. 3, showing the biting edges made thinner and their offset exaggerated.

Fig. 5 is a part section on line 5—5 of Fig. 2.

1 and 2 are annular rings spaced apart and connected by a plurality of radially disposed bars 3. These bars are preferably spaced apart circumferentially and are formed integral with the rings.

The main part or body of each bar is flat and its lateral edges comprise a pair of biting or gripping edges, one of them, 4, slightly offset by being bent or flanged upwardly, and the other, 5, flanged downwardly. Each of the flanged margins so formed is, as shown in Figs. 3 and 5, of narrow width, that is, it has a very narrow flange that bends sharply upward or downward from the flat body 3. The flanged margin is thus of suitably narrow width to cause its biting or gripping edge to engage the face of the work, which may be the base of a nut, or the base of a bolt head, and dig into the same by a slight backward rolling movement when the work tends to turn in a direction to unscrew. In this respect the action of the biting edge is distinguished from the biting edges heretofore commonly provided on the ends of the long spring-like tongues which have been provided in previous lock washers of the general type to which this improvement pertains. The two biting edges of any bar 3 may be parallel, as in Fig. 2, or radial as in Fig. 1, or otherwise suitably disposed.

These edges, 4, 5, are straight and equidistant from the plane of the washer as at Y—Y, Fig. 5, and consequently adapted to contact throughout their length against the face of the nut or the sub-structure. In that respect they differ from the teeth of spring washers in which warping or twisting the teeth is resorted to in order to secure an offset biting edge, because an edge so produced is effective for only a part of its length.

To enable the offset parts or flanges 4 and 5 to be formed with biting edges effective throughout their full length and to accomplish this without warping or twisting the bar 3, a recess 6 is provided at each end of each offset part 4, 5. This recess is preferably a slit of any suitable shape cut into the bar a distance approximately equal to the depth of the desired flange or offset part, as indicated at X—X, Fig. 2.

The working or biting flanges may be of the same thickness as the rings 1, 2, as shown in Fig. 3, or they may be made thinner by swaging or otherwise, as at 7, 8 in Fig. 4. A thinned edge is preferable because it can not be entirely flattened, but retains its ability to press outwardly and bite into the nut as soon as the nut tends to unscrew even though the nut had been jammed tight down upon the flat face of the washer.

In my co-pending application, Serial No. 9145, filed February 14, 1925, I have described and claimed the broader aspects of the slit and hole construction, and have therein illustrated my improvement as applied to a washer, the body of which is a single annular ring.

Having thus described my invention, what I claim and desire to secure by Letters Patent is:

A spring-tooth lock washer comprising an inner and an outer concentric annular ring of spring material spaced apart and connected by a plurality of substantially radial bars spaced apart circumferentially and spanning the annular space between said rings, the two lateral margins of each bar flanged, one upwardly, the other downwardly, each of said flanged margins being of suitably narrow width to cause its gripping edge to engage the face of the work and dig into the same by a rolling movement when the work tends to turn in a direction to unscrew the same.

In testimony whereof, I affix my signature.

RICHARD T. HOSKING.